United States Patent
Braun

(10) Patent No.: US 8,282,387 B2
(45) Date of Patent: Oct. 9, 2012

(54) HOT RUNNER NOZZLE FOR LATERAL SPRAYING

(75) Inventor: Peter Braun, Hungen (DE)

(73) Assignee: Ewikon Heisskanalsysteme GmbH & Co KG, Kirchlengern (DE)

( * ) Notice: Subject to any disclaimer, the term of this patent is extended or adjusted under 35 U.S.C. 154(b) by 0 days.

(21) Appl. No.: 12/936,713

(22) PCT Filed: Apr. 1, 2009

(86) PCT No.: PCT/EP2009/053866
§ 371 (c)(1),
(2), (4) Date: Oct. 7, 2010

(87) PCT Pub. No.: WO2009/124865
PCT Pub. Date: Oct. 15, 2009

(65) Prior Publication Data
US 2011/0033570 A1 Feb. 10, 2011

(30) Foreign Application Priority Data

Apr. 11, 2008 (DE) .................... 20 2008 005 073 U
Oct. 1, 2008 (DE) .................... 20 2008 013 086 U

(51) Int. Cl.
*B29C 45/22* (2006.01)
(52) U.S. Cl. .................... 425/549; 264/328.15; 425/572
(58) Field of Classification Search .................... 425/562, 425/563, 564, 565, 566, 572, 549, 588; 264/328.15
See application file for complete search history.

(56) References Cited

U.S. PATENT DOCUMENTS

| 4,094,447 | A | 6/1978 | Gellert |
| 5,474,439 | A | 12/1995 | McGrevy |
| 5,536,165 | A | 7/1996 | Gellert |
| 5,736,171 | A | 4/1998 | McGrevy |
| 5,980,237 | A * | 11/1999 | Swenson et al. ............... 425/549 |
| 7,547,208 | B2 * | 6/2009 | Babin et al. .................... 425/562 |
| 7,658,606 | B2 * | 2/2010 | Klobucar et al. ............. 425/564 |
| 7,794,228 | B2 * | 9/2010 | Catoen .......................... 425/549 |
| 7,803,306 | B2 * | 9/2010 | Babin et al. ................ 264/328.9 |
| 2002/0098262 | A1 | 7/2002 | Babin |
| 2005/0196486 | A1 | 9/2005 | Babin et al. |
| 2006/0222730 | A1 | 10/2006 | Barth |
| 2008/0044513 | A1 | 2/2008 | Babin et al. |

FOREIGN PATENT DOCUMENTS

| DE | 90 03 574 | 7/1990 |
| DE | 197 42 099 | 4/1998 |
| DE | 299 02 185 | 6/1999 |
| DE | 103 45 578 | 5/2005 |
| EA | 0 743 159 | 11/1996 |
| EP | 0 186 413 | 7/1986 |
| EP | 0 447 573 | 9/1991 |
| EP | 1 524 091 | 4/2005 |
| WO | 99/37461 | 7/1999 |
| WO | 2008/004968 | 1/2008 |

* cited by examiner

*Primary Examiner* — Tim Heitbrink
(74) *Attorney, Agent, or Firm* — Barnes & Thornburg LLP

(57) ABSTRACT

A hot runner nozzle for lateral injection of plastic components. The nozzle includes a multi-part nozzle body including at least one tip element which protrudes outwardly over a circumferential area of the nozzle body. The multi-part nozzle body further includes a nozzle body clamping disk section and a nozzle body base section having an axial side that has at least one recess arranged on the axial side to accommodate the at least one tip element.

38 Claims, 13 Drawing Sheets

Fig. 14
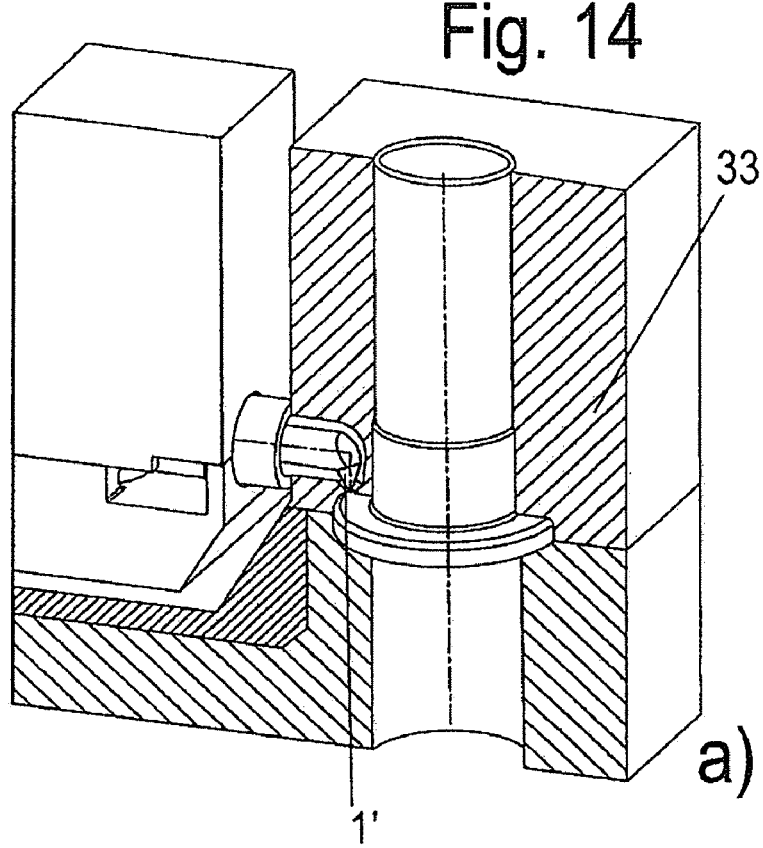
a)
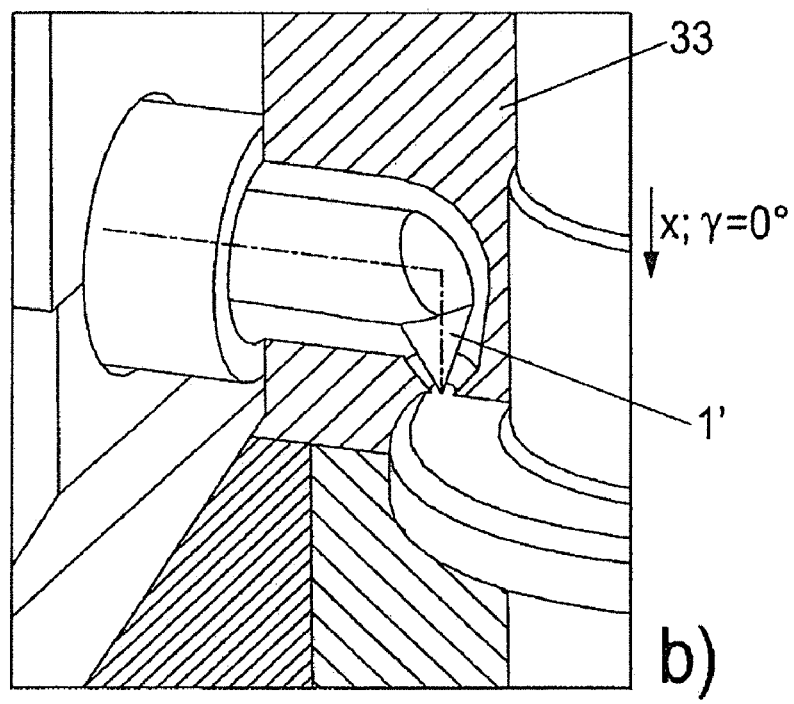
b)

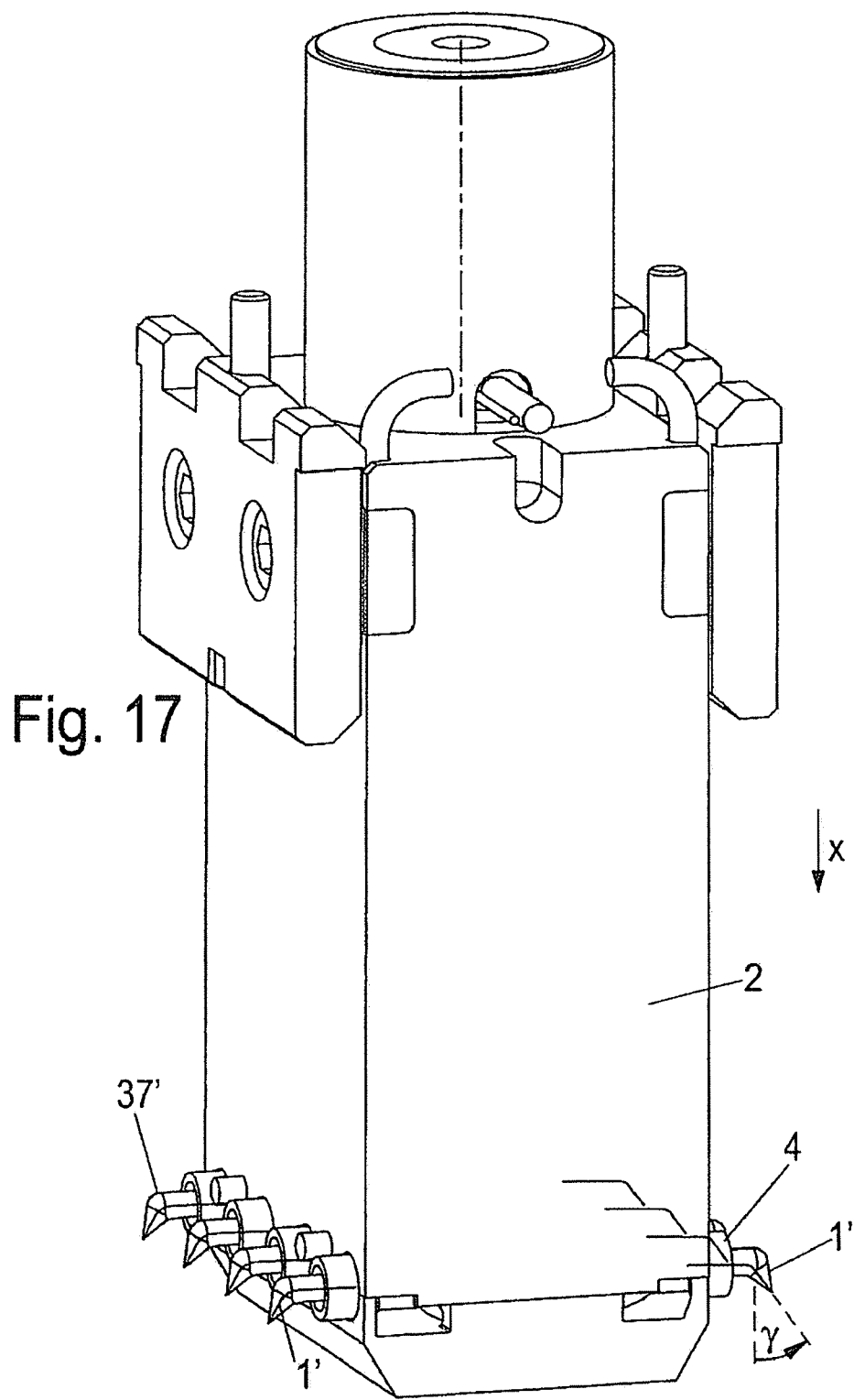

HOT RUNNER NOZZLE FOR LATERAL SPRAYING

BACKGROUND OF THE INVENTION

This application is a national stage of International Application PCT/EP2009/053866, filed Apr. 1, 2009 and claims benefit of and priority to German Patent Application Nos. 20 2008 005 073.1 filed Apr. 11, 2008, and 20 2008 013 086.7, filed Oct. 1, 2008, the content of which Applications are incorporated by reference herein.

The present disclosure relates to a hot runner nozzle for lateral injection of plastic components. The nozzle includes a multi-part nozzle body having one or more tip elements which protrude outwardly over a circumferential area of the nozzle body.

WO 99/37 461 A1, US 2002/0098262 and EP 0186 413 A2 are representative of the technological background.

It is often advantageous in the field of injection molding for plastic to perform injection for plastic parts laterally, that is perpendicularly or obliquely in relation to the demolding direction. For this purpose, so-called hot runner nozzles for lateral injection are used, which are also known as lateral injection nozzles and which comprise a nozzle body and tip elements. In order to achieve good temperature control for the melt up to the surface of the article, the nozzle tips or tip elements must be guided up to the surface of the article.

It is further known to divide the mold components, or the die components, which enclose the nozzle body, so that the nozzle tips or the nozzle body can be mounted in the case of multi-cavity arrangements. Such a state of the art is shown in DE 100 08 471 A1. The division is disadvantageous because a complex construction of the die needs to ensure the necessary retaining forces in order to prevent leakages.

That is why constructions of lateral injection nozzles with tip elements appear to be advantageous which allow using non-divisible inserts. This can occur for example with adjustable tip elements, as proposed in DE 197 42 099 A1, or with the help of subsequent mounting of the tips in an integral nozzle body once the nozzle body has been mounted (see EP 1524091A2 and DE 103 45 578 A1, for example). In the case of the tip elements held in tight fit, the fit clearances are so tightly held after some time of use by the combusted plastic that destruction-free dismounting is often not possible.

The disadvantages of an adjusting mechanism are the filigree components which are partly wetted with the melt and after prolonged use no longer allow reliable adjustment or dismounting of the tips. The adjusting devices often do not permit any high force/pressure loads because they do not offer sufficient pressure surface due to the limited overall space.

The tip elements that can be mounted in the integral nozzle body on the other hand must be arranged to be very small in order to remain mountable. Moreover, the mounting/dismounting in known systems is exceptionally difficult and can often only be achieved with the destruction of the tips after prolonged use.

It is known from the generic EP 0 447 573 A1 and the priority-establishing DE 90 03 574 to arrange the nozzle body not in an integral manner but in a divided way, so that this difficulty is reduced. A holding ring is placed on a kind of base part (see FIG. 1 of EP 0 447 573 A1), on the axial side of which guide tips are held with a clamping ring. The mounting and dismounting of the tip elements is still not simple enough. Moreover, the melt flow is also not guided in a leakage-free manner from the melt entrance into the nozzle body up to the gate on the article, because the melt can also exit axially from the base part and flow about the guide tips. Considerable difficulties can occur during the dismounting of the tip elements by the ambient solidified plastic compound. The solidified plastic compound needs to be removed at first in a laborious fashion. Alternatively, the hot nozzle can be dismounted with the still doughy plastic.

The present disclosure is, therefore, based on further developing this generic state of the art, based on the concept of a divided nozzle body, in such a way that it is possible to house even relatively large tip elements in the nozzle body in a simple manner and to mount them and dismount them again after longer use in an easy manner.

The present disclosure thus relates to a hot runner nozzle for lateral injection of plastic components. The nozzle includes a multi-part nozzle body including at least one tip element which protrudes outwardly over a circumferential area of the nozzle body. The multi-part nozzle body further includes a nozzle body clamping disk section and a nozzle body base section having an axial side that has at least one recess arranged on the axial side to accommodate the at least one tip element which is pressed with the nozzle body clamping disk section against the axial side of the nozzle body base section.

The present disclosure provides for a hot runner nozzle which is arranged in such a way that the tips can be inserted easily in a multi-part nozzle body which previously has been built into a die. The chosen arrangement allows arranging the tip elements with a relatively large overall size.

US 2005/0196486 also shows an integral nozzle body with a projection integrally formed thereon. FIG. 2 of the present disclosure has a different hatching than the remaining nozzle body for illustration purposes.

In accordance with the present disclosure, the at least one tip of a tip element easily reaches the surface of the article to be injected. And, after a complete mounting of all components, the melt flow is guided in a leakage-free manner from the melt entrance to the nozzle body up to the gating on the article.

Relatively large retaining forces can be realized by the arrangement, according to the present disclosure, of the nozzle body, so that high tightness can be achieved.

After the mounting of the tip inserts, the sealing sleeves rest on the wall of the die insert, according to an embodiment of the present disclosure. Or, they are spaced to such an extent that, after reaching the operating temperature, there is sufficient surface pressing between the sealing sleeve and the wall of the die insert by thermal expansion of the overall nozzle.

Other aspects of the present disclosure will become apparent from the following descriptions when considered in conjunction with the accompanying drawings.

BRIEF DESCRIPTION OF THE DRAWINGS

FIG. 14a shows a partial sectional perspective view through a partial area of a die with a tip insert according to FIGS. 12 and 13.

FIG. 14b shows an enlarged view of a section of FIG. 14a.

FIG. 15 shows a section through the arrangement of FIG. 14a.

FIG. 17 shows a perspective view of another hot runner nozzle, according to the present disclosure.

DETAILED DESCRIPTION

Figure 1:
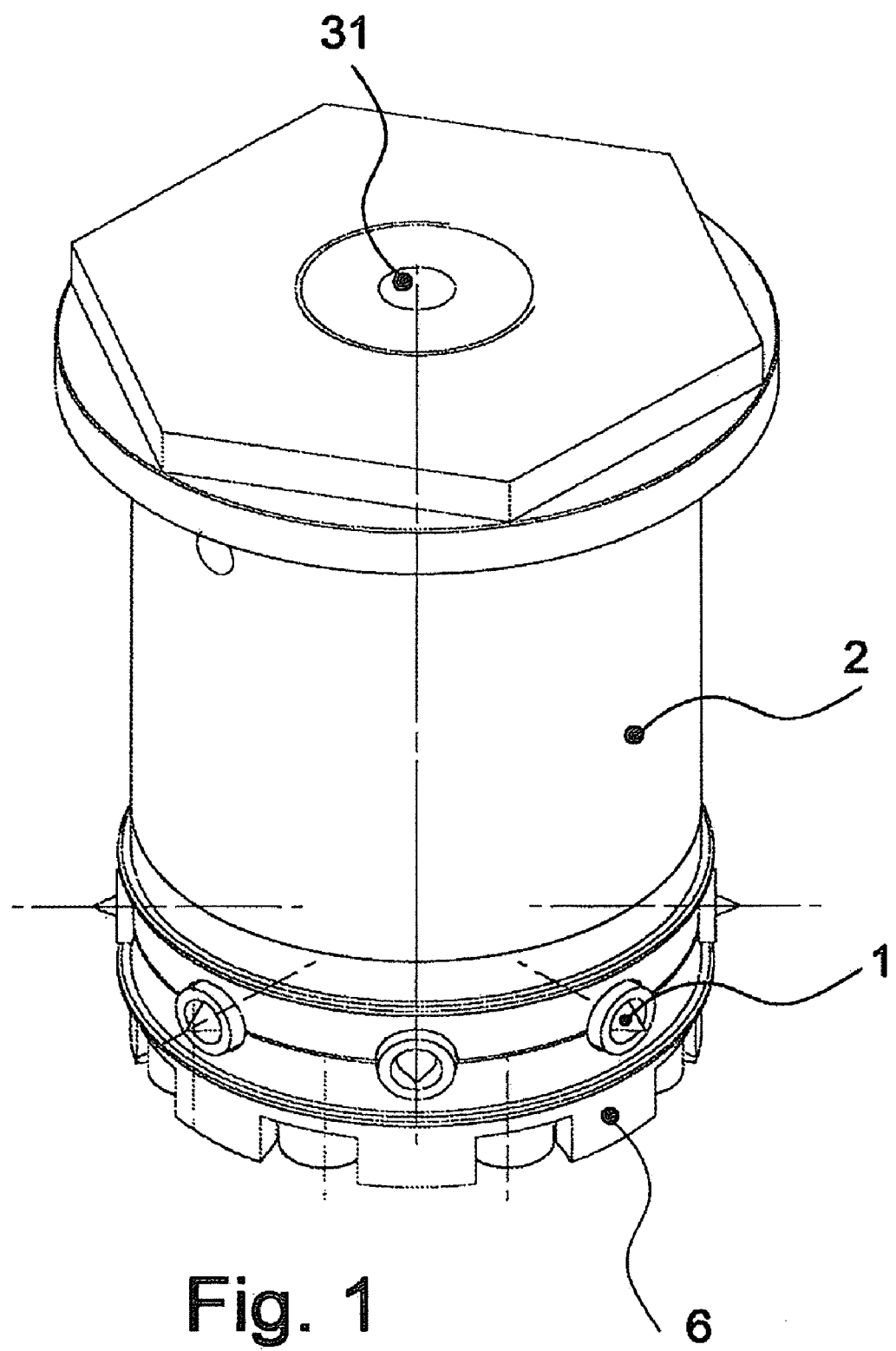
FIG. 1 shows a perspective view of a hot runner nozzle with a multi-part nozzle body with tip inserts inserted therein, according to the present disclosure.
Figure 7:
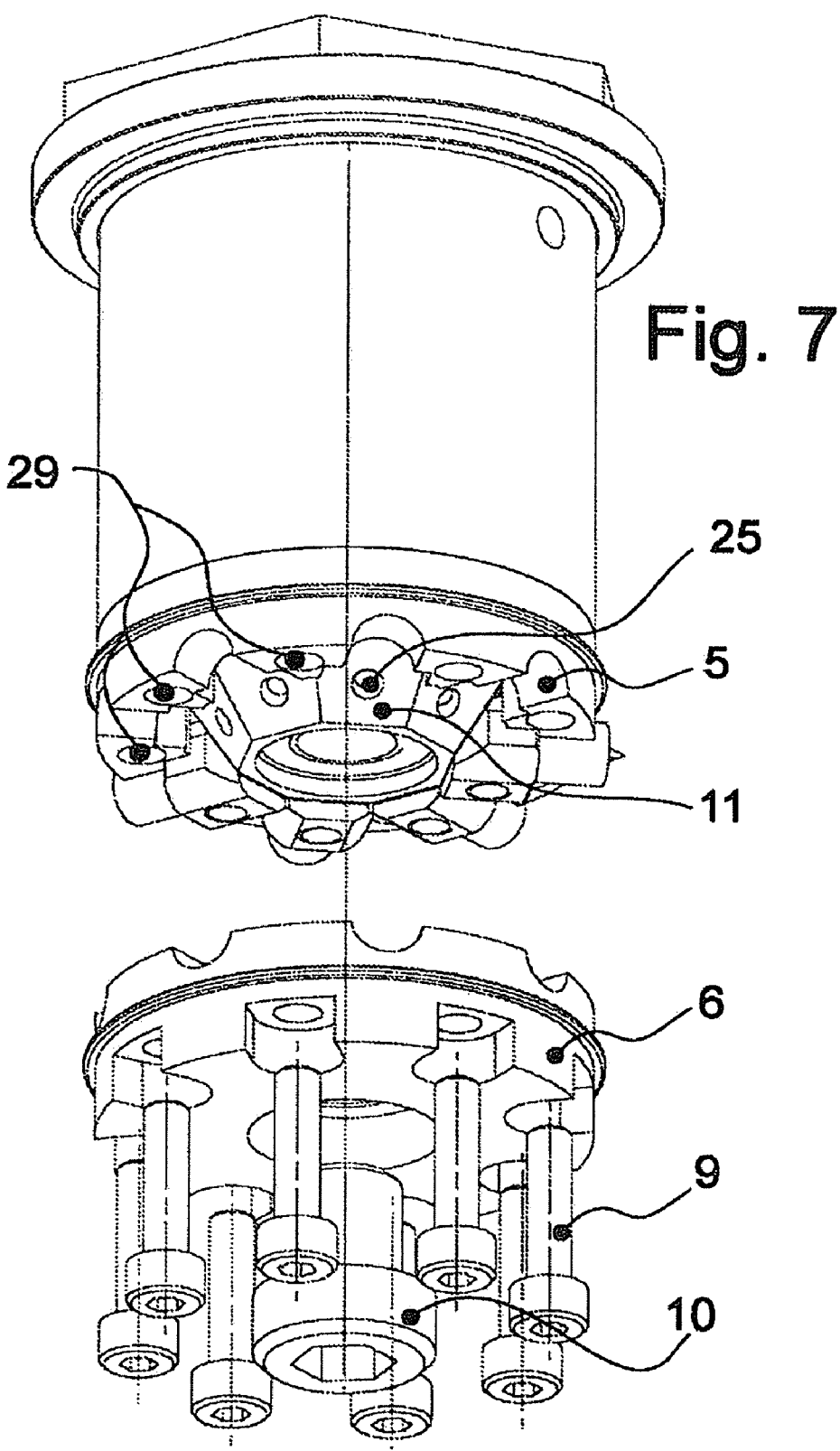
FIG. 7 shows a perspective view of a nozzle body with a base section of the nozzle body and clamping disk section of the nozzle body with fastening screws, according to the present disclosure.

FIG. 1 shows a hot runner nozzle configured for lateral injection of plastic components. The nozzle comprises a multi-part nozzle body with a nozzle body base section 2 and a nozzle body clamping disk section 6. The nozzle body base section 2 and nozzle body clamping disk section 6 having a cylindrical outside jacket (see also FIGS. 7 and 8). The nozzle body base section 2 has an axial side which is provided with one or more recesses 5, 14 for accommodating tip inserts 37. The recesses 5, 14 are arranged, for example, radially on an axial side in a distributed manner over the circumference. It is within the scope of the present disclosure that the outside jacket may have a non-circular cross section, for example, an elliptical, oval or polygonal cross section (not shown).

As suggested in FIG. 1, the axial side is the bottom axial side. As suggested in the Figures, at least one tip insert 37 with at least one tip element 3 is arranged on this axial side. As is suggested in the Figures, several tip inserts 37 can be held in the multi-part nozzle body.

The disclosure herein shall be understood to be exemplary and not in any limiting manner regarding, among other things, the description of the position of only one or, at other locations, several of the tip elements 3, 3'. Terms such as "upper" or "bottom" shall not be understood to be limiting, but merely relate to the respective arrangement and alignment in the Figures.

Figure 8:
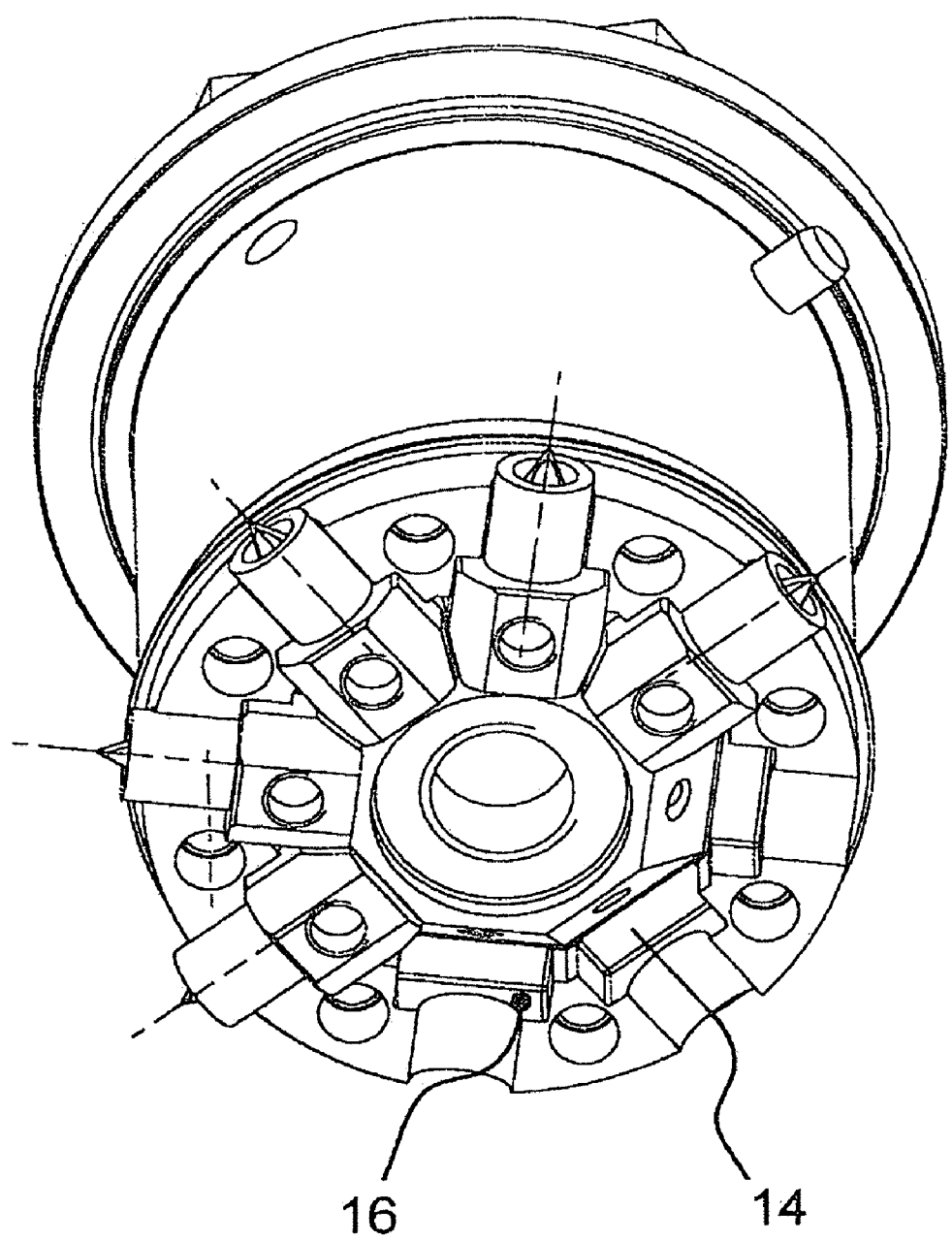
FIG. 8 shows a perspective view of the base section of the nozzle body of FIG. 7 with tip inserts arranged thereon.

On an opposite axial side, which is considered to be the upper axial side in FIG. 1, the nozzle body base section 2 comprises a melt entrance 31 opening into a melt channel 25 (see FIG. 2) which extends at first via a first section 25a axially through the nozzle body base section 2 to a branching 25b, from which partial channels 25c branch off in an outwardly radiating manner which each open into recesses 14 (see FIG. 8).

The partial channels 25c are in alignment with entrance openings 12a of melt, or guide, channels 12 in the tip elements 3 which are inserted in the recesses 14.

The tip elements 3 (see FIGS. 2 and 3) each have a base body 19, adjacent to which there is a tip 1 with a cylindrical area and a radially outwardly adjacent conical or acute area. Tip 1 faces outwardly in the mounted state on the nozzle body base section 2, radially as shown, and protrudes further radially in the conical area beyond the circumferential edge of the nozzle body base section 2 (see FIGS. 1 and 2).

Tip inserts 37 are arranged in such a way that after an insertion in the recesses 5, 14, they are partly enclosed, for example, half enclosed, and rest with a base body 19 in their area facing away from the tip 1. This occurs with an oblique surface 8 in reverse against an oblique surface 11 and on a side facing the actual tip 1 via a shoulder 15 on a respective surface 16 of the recess 14 (see FIGS. 2, 3, 4, 5, 7 and 8). The outlet opening 25d from the melt channel 25 is arranged in the oblique surface 11 and the entrance opening 12a of the guide channels 12 into the tip elements 3 in the oblique surface 8.

The guide channels 12 each comprise an outlet opening 12b into an annular gating recess 32 which encloses the nozzle tip 1 (see FIG. 2) which is partly formed by a sealing sleeve 4 mounted on the base body 19.

The multi-part nozzle body comprises the nozzle body clamping disk section 6 in addition to the nozzle body base section 2, which clamping disk section 6 is provided on its axial side facing towards the nozzle body base section 2 with a circumferential edge 28. Circumferential edge 28 comprises a central recess 17, with the edge 28 being provided with radially aligned recesses 7 on the axial side provided in the mounted state relative to the recesses 5, 14 of the nozzle body 2, in which the tip inserts 37 engage and which are opposite of the recesses 14 in the mounted state.

The nozzle body clamping disk section 6 downwardly delimits the area in cooperation with the sealing sleeve 4 through which the melt flows when passing through the nozzle body and stabilizes the sealing sleeve 4 on its circumference.

The nozzle body clamping disk section 6 is held in a simple manner on the nozzle body base section 2 in a simple manner by at least one or several fastening screws 9, 10. The screws 9, 10 penetrate bore holes of the nozzle body clamping disk section 6 and are screwed into threaded bores 29 of the nozzle body from its axial side.

It is within the scope of the present disclosure to provide only one single fastening screw 10, for example, a fastening screw 10 which extends in the central longitudinal axis of the nozzle body base section 2 and which is dimensioned accordingly. The effect of this fastening screw 10 can be supported by one or several fastening screws 9 which are, for example, arranged on a concentric circle about the central fastening screw 10 and which can also be dimensioned smaller than the middle fastening screw 10.

The nozzle body clamping disk section 6 is aligned axially to the nozzle body base section 2. The nozzle body disk section 6 comprising a recess 17 that fixes the tip elements 3 in an interlocking and frictional way on the nozzle body base section 2 in such a way that the sealing surface 8 of the nozzle element 3 rests in a sealing manner on the surface 11 of the nozzle body 2 with high surface pressing.

The nozzle tips 1 protrude radially outwardly beyond the outer circumference of the nozzle body clamping disk section 6 and the nozzle body base section 2.

Without the nozzle body clamping disk section 6, the tip elements 3 would not be held on the nozzle body base section 2 and the melt path into the tool would not be complete.

In the mounted state, each tip element 3, 3' rests with a radially outwardly facing shoulder 15 on the respective surface 16 of the recess 14 of the nozzle body 2.

The nozzle body base section 2 is enclosed by at least one heating element 20 on its side facing away from the axial side with the recesses 5, 14. The heating element 20 is enclosed by an outer sleeve 21 which carries a secondary sealing collar 23. A support and centering ring 22 fixes the heating element 20 and the sleeve 21 and is fixed in an interlocking manner, for example, with a thread, to the nozzle body base section 2.

The nozzle body clamping disk section 6 also carries a secondary sealing collar 24.

The tip 1 is configured and arranged in such a way that in the mounted state it reaches the surface of an article 30 to be injected. After a complete mounting of all parts, the melt flow is guided in a leakage-free manner from the melt entrance 31 up to the gate 36 on the article 30.

Figure 3:
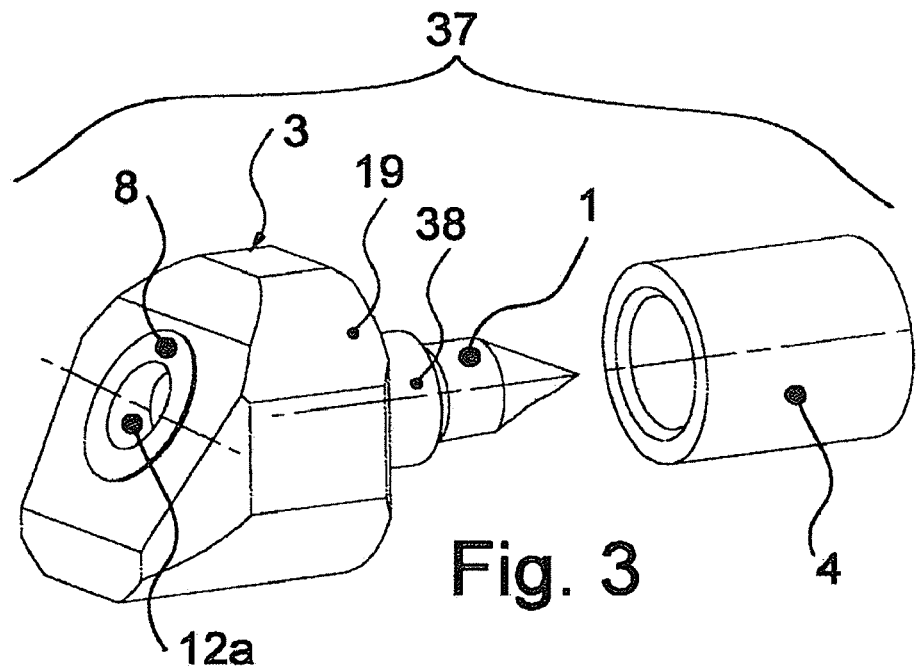
FIG. 3 shows a perspective view of a tip insert with a tip element and a sealing sleeve, according to the present disclosure.
Figure 4:
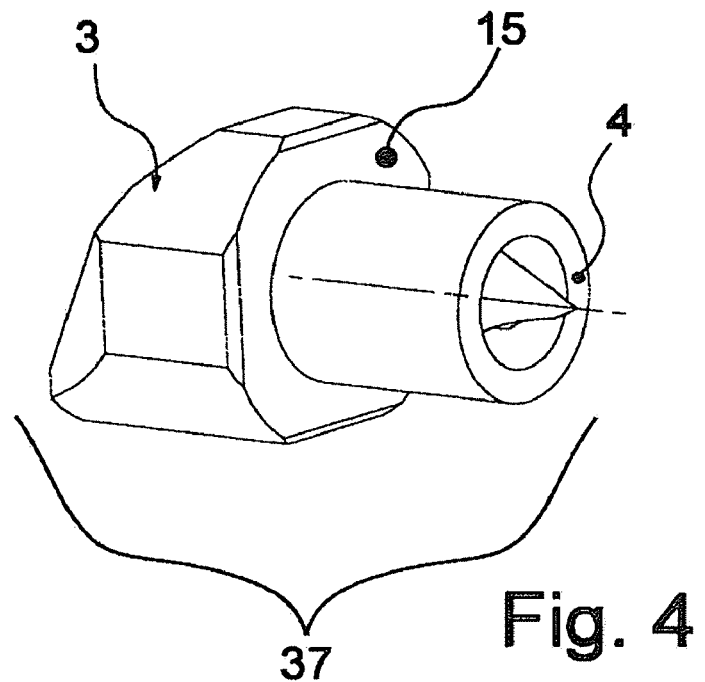
FIG. 4 shows a further perspective view of the tip insert of FIG. 3.
Figure 5:
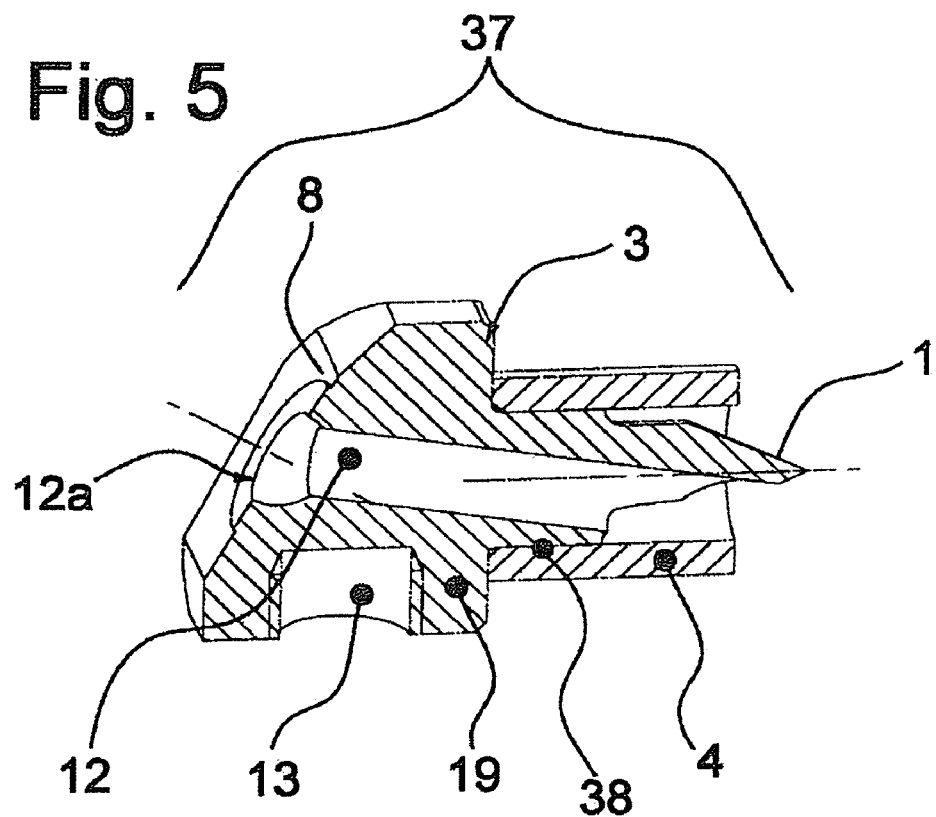
FIG. 5 shows a sectional view through the tip insert of FIG. 4.

The nozzle body base section 2 is arranged in such a way that one or several tip inserts 37, which includes tip element 3 and the sealing sleeve 4 mounted thereon, can be inserted into the respective recesses 5, 14 on the nozzle body base section 2 in such a way that tip 1 will reach a surface of the article 30 (see FIGS. 3 to 5).

The recesses 5 on the nozzle body base section 6 partly encompass the tip insert 37 only partly as shown, for example, only up to half the height (see FIG. 8).

It is the mounting of the nozzle body clamping disk section 6 in which corresponding recesses 7 are present that will fix the tip inserts 37.

After the mounting of the tip inserts 37, the sealing sleeves 4 rest on a wall 34 of die insert 33, or they are spaced to such an extent that after reaching the operating temperature as a result of the thermal expansion of the entire nozzle, a sufficient surface pressing is obtained between the sealing sleeve 4 and the wall 34 of the die insert 33. The sealing sleeve 4 rests over a portion of its axial length on a cylindrical shoulder 38 of the tip element 3 which is adjacent to the base body 19 (see FIGS. 3 to 5). It is advantageous that the sealing sleeves 4 are not wetted on their outside circumference by plastic, leading to good dismounting capabilities for the arrangement.

It is within the scope of the present disclosure to produce or arrange at least one tip insert 37 in an integral manner. That is, the tip element 3 with the sealing sleeve 4.

Figure 2:
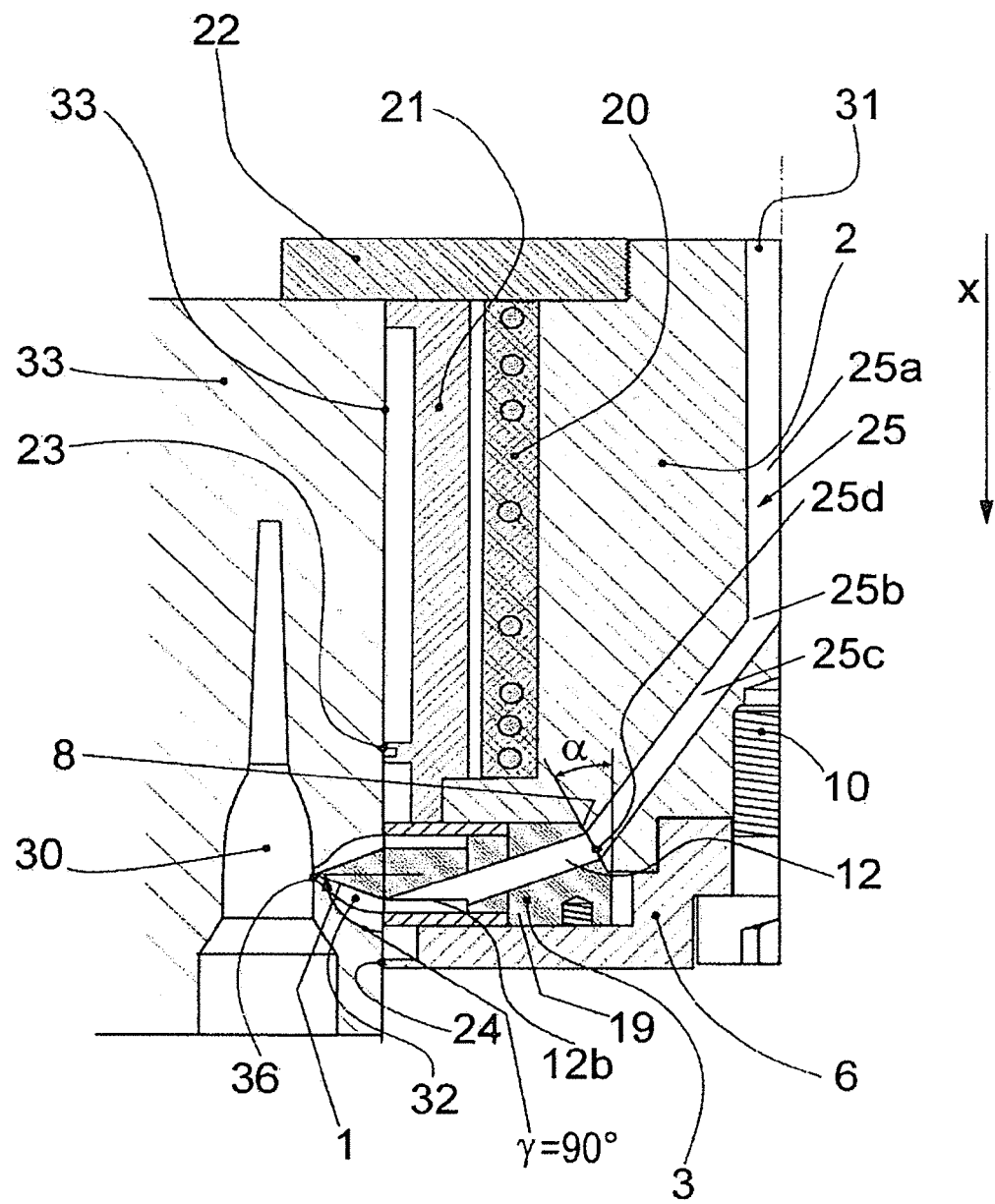
FIG. 2 shows a sectional view through a partial area of a die with an arrangement according to FIG. 1.

The rear-side contact surface 8 of the tip element 3 is arranged under a certain angle $\alpha$, for example, at an acute angle relative to the axial direction X (see FIG. 2). Thus, by tightening the fastening screws 9, 10 of the nozzle body clamping disk section 6, the tip element 3 is pressed against the pressure surface 11 (see FIG. 7) of the nozzle body 2 which is arranged at the same angle. The angle $\alpha$ may be larger than 5°, or, angle $\alpha$ may be between 10° and 65°. See, for example, FIG. 2.

The arrangement of the angle $\alpha$ leads to the consequence that, as a result of the introduced axial screw forces, a high surface pressing is obtained between the rear-side area 8 of the tip element 3 and the respective counter-surface 11 of the nozzle body base section 2.

This is necessary because the melt channel 12 to the tip elements 3 is connected via this surface with the partial channel 25 and thus the tightness or freedom from leakages between the melt channel 12 and the partial channel 25c is ensured. As a result, the melt channel 12 is a tight channel from the melt channel or area 25 up to the gate 36.

Figure 6:
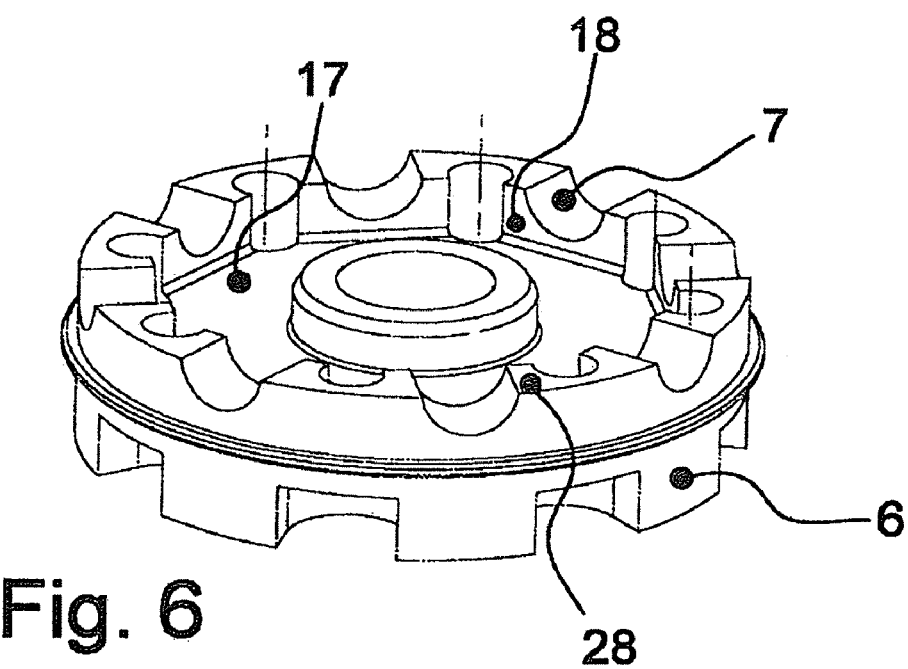
FIG. 6 shows a perspective view of a section of a clamping disk of the nozzle body of FIG. 1.

In order to ensure that the axial force can act upon the tip elements 3 in an unrestricted way, the nozzle body clamping disk section 6 must be arranged in such a way that it only presses on the tip elements 3. Furthermore, the tip elements 3 must be able to rest with their shoulder 15 on the surface 16 of the nozzle body base section 2. The tip elements 3 may rest on surface 18 (see FIG. 6) of the nozzle body clamping disk section 6.

As a result of the thermal expansion of the entire lateral injection nozzles, the sealing sleeves 4 are pressed against the die wall 34. This produces the sealing effect between the melt channel 12 of the tip element 3 and the gating recess 32 in the die insert 33.

Although the reaction force between the sealing sleeves 4 and the die wall 34 relieves the tensioning situation between the tip elements 3 and the two-part nozzle body base section and clasping disk section 2, 6, respectively, the sealing force on the rear side of the tip element 3, that is, the melt channel transition from the nozzle body 2, is thus not relieved. On the contrary, the surface pressing is usually even increased.

Figure 9:
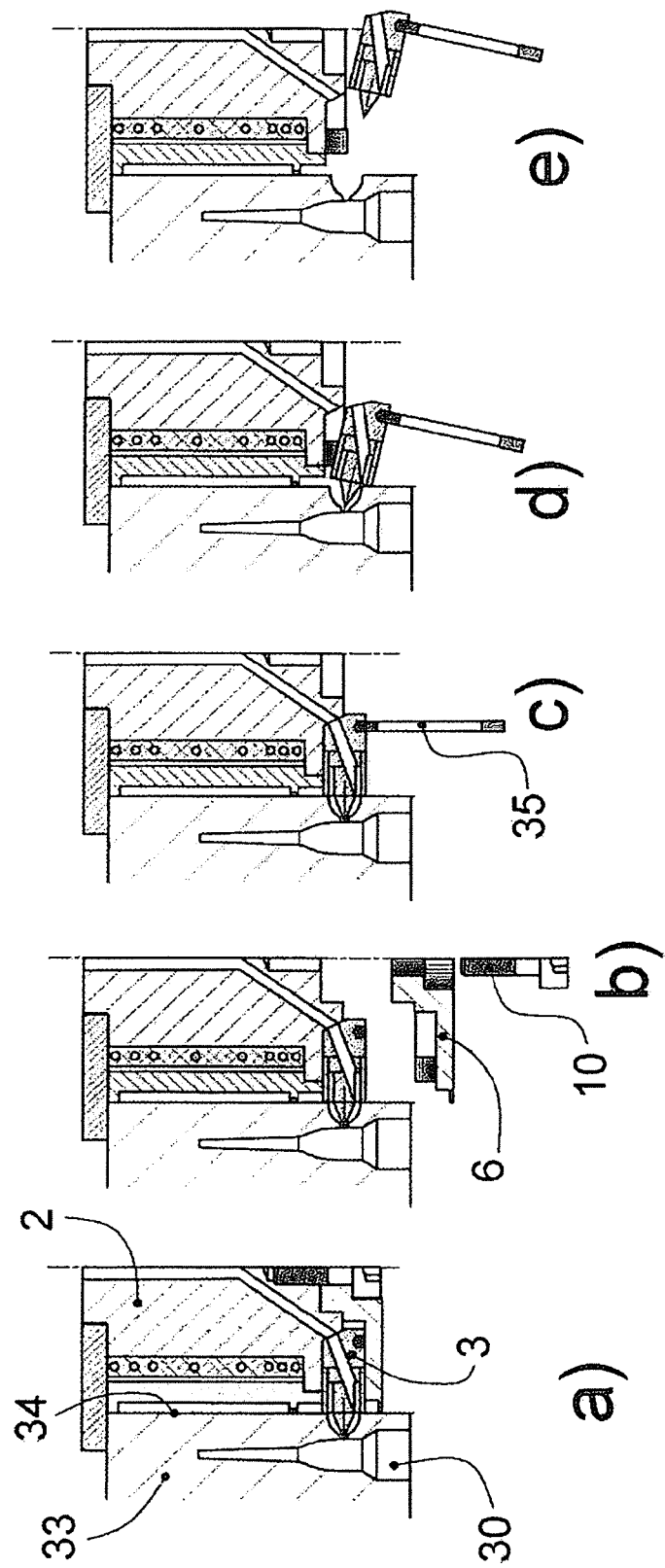
FIGS. 9a to e show the dismounting of a nozzle body and a tip insert in five subsequent steps, according to the present disclosure.
Figure 10:
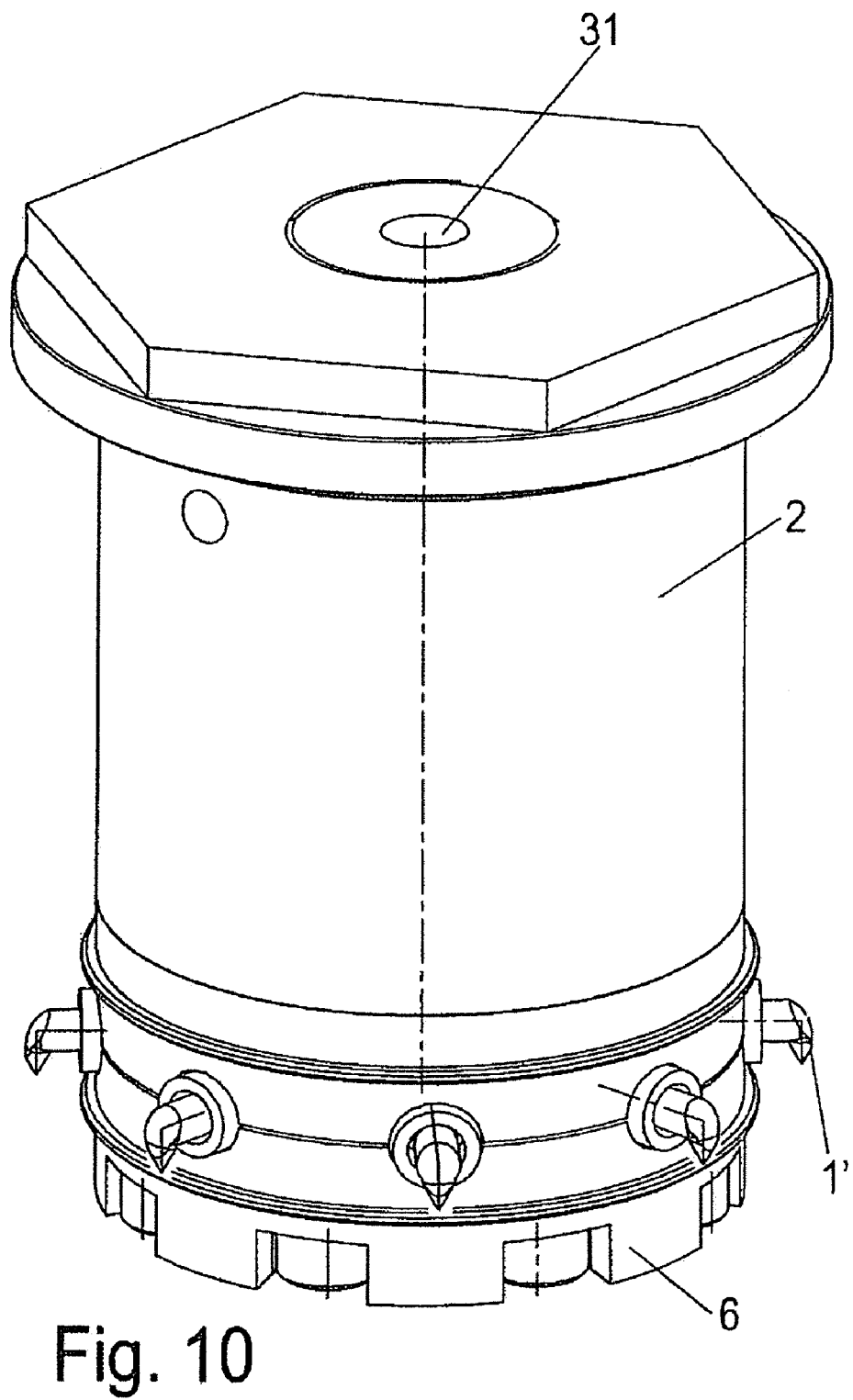
FIG. 10 shows the hot runner nozzle of FIG. 1 with tip inserts arranged for angular lateral injection.

As is shown in FIG. 9, an advantage of the construction, according to the present disclosure, includes the fact that the tip inserts 37 can easily be dismounted after screwing out the nozzle body clamping disk section 6. Such a destruction-free detachment of the tip inserts 37 in a pivoting manner is enabled by a tool on an actuating contour.

It is advantageous, according to the embodiment shown in FIG. 9, that a lever arrangement is obtained by a threaded pin 35 which is screwed into a threaded bore 13, which lever arrangement enables the destruction-free detachment of the tip insert 37.

The actuating contour can, within the scope of the present disclosure, alternatively be an actuating projection or an actuating recess (not shown) which allows the application of a lever element (not shown).

It is important that at first the clamped angular surfaces can be separated by the lever arrangement, so that the bonding of forces is detached. The detached tip inserts 37 can be dismounted by turning and displacing the same.

Whereas the embodiments discussed above each show a lateral injection in the horizontal direction, which means at an angle of 90° in relation to the main opening direction X of the hot runner nozzle, it is, within the scope of the present disclosure, by the advantageous pivoting mounting of the tip inserts 37' to realize a further injection angle $\gamma$ beyond a standard angle of 90° in lateral injection, which further injection angle can reach from 45° up to 0° for example, with $\gamma$=90° describing the radially outwardly extending direction and $\gamma$=0° describing the direction perpendicularly downwardly, which corresponds in this case to the axial direction X or the mounting direction X.

Figure 15:
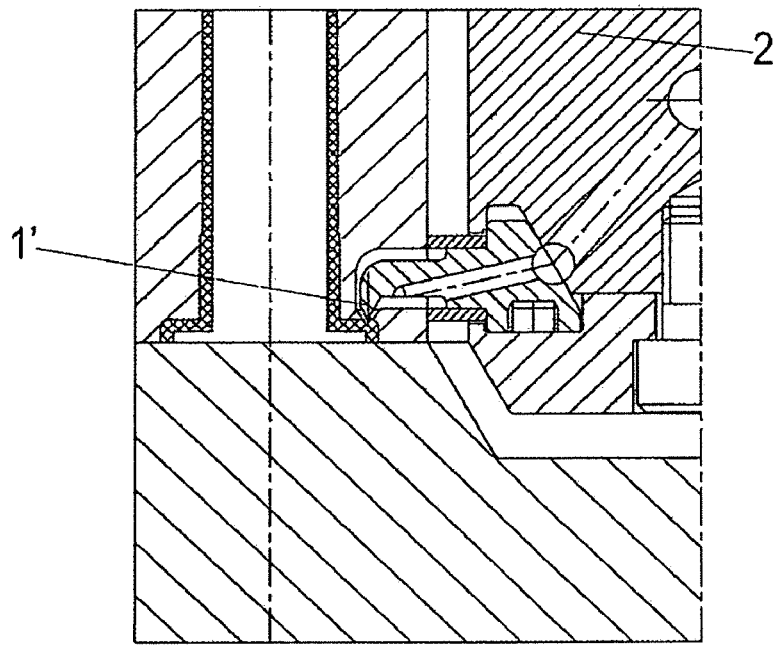
Figure 16:
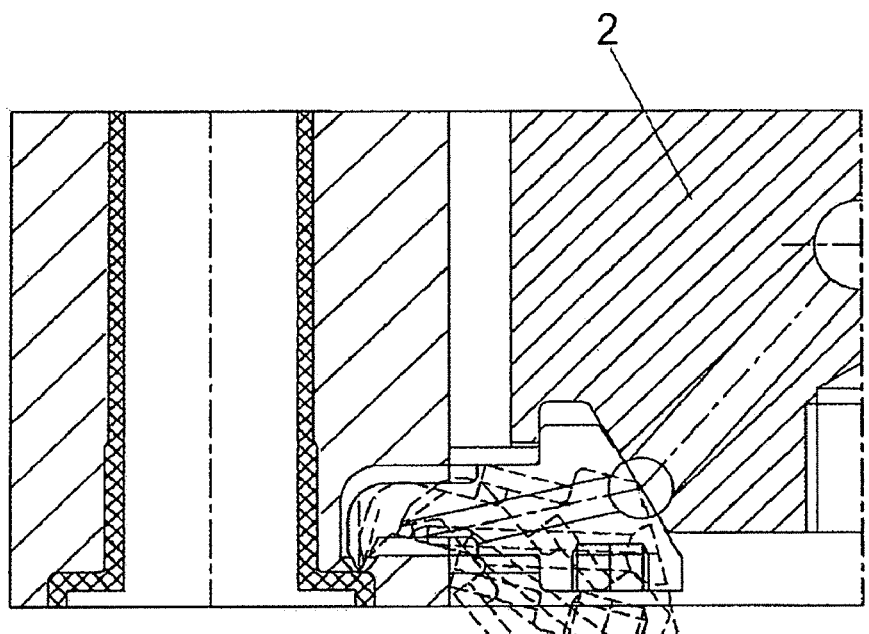
FIG. 16 shows a mounting/dismounting of the tip inserts in an arrangement according to FIG. 14.

The pivoting installation or detachment of the tip inserts 37' also allows achieving undercut tab geometries (see FIGS. 14, 15, 16).

Figure 11:
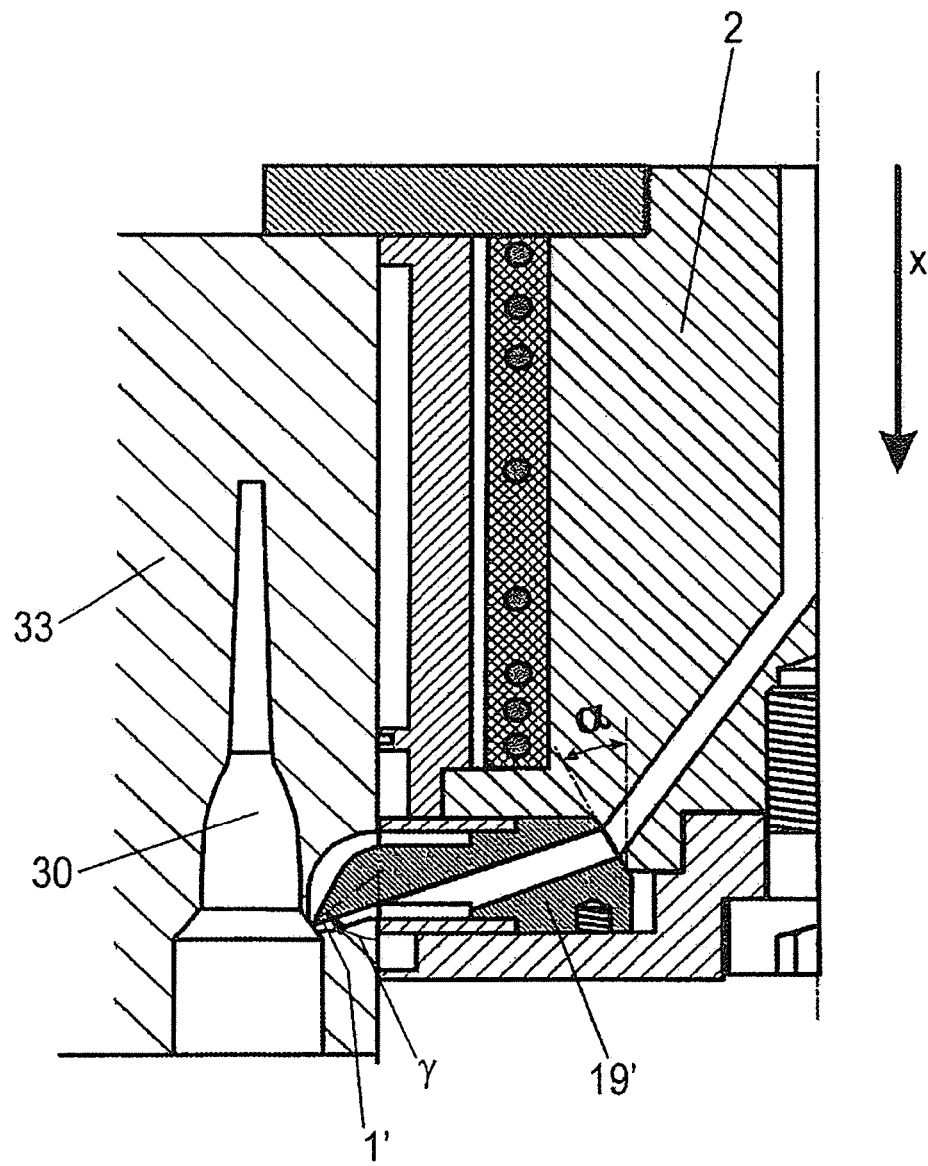
FIG. 11 shows a sectional view through a partial section of a die with further tip inserts arranged for angular lateral injection, according to the present disclosure.

The tip inserts 37' remain aligned perpendicularly to the axial direction X with their "main axis" and only the actual conical tip 1' itself is arranged at the required angle $\alpha$, e.g. $\gamma$=30°, 45° or 0°, bent in relation to the axial direction/mounting direction X with reference to the nozzle body clamping disk section 6 (see FIG. 11).

The "horizontal" main axis, for example, 90° to the direction X of the tip inserts 37' is advantageous because in this way the sealing sleeve 4 still rests horizontally on the nozzle body base section 2 as a result of thermal expansion, as described above in connection with FIGS. 1 to 9, through which the reliable sealing between the hot runner nozzle and the die insert 33 is produced.

In accordance with the embodiments of FIGS. 10 to 17, the tip elements 3' each comprise a base body 19', adjacent to which there is a tip 1' with a firstly cylindrical area 1a' with horizontal axis and a conical tip area 1b' which is outwardly adjacent under an angle to the cylindrical area.

The cylindrical area 1a' protrudes outwardly in the mounted state on the nozzle body over the circumferential edge of the nozzle body base section 2 and the tip area 1b' is aligned obliquely in relation to the axis of the cylindrical area.

Figure 12:
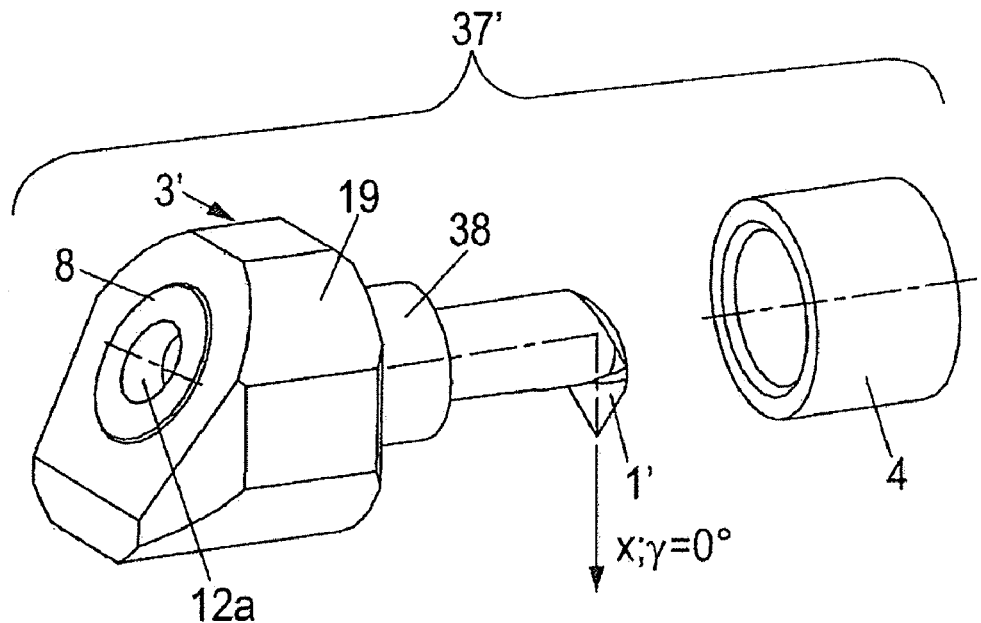
FIG. 12 shows a perspective view of the tip insert of FIG. 10 with a tip element and a sealing sleeve.
Figure 13:
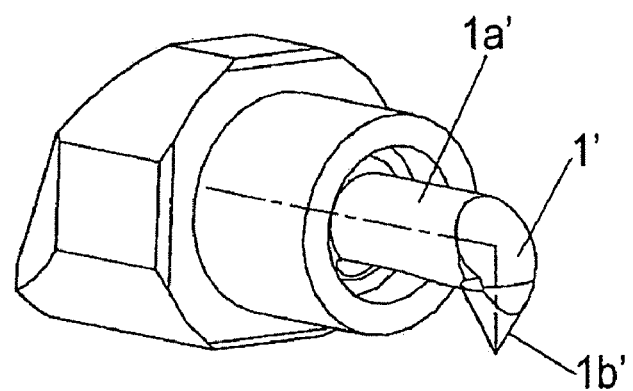
FIG. 13 shows elements of FIG. 12 in an assembled state.

As is shown in FIGS. 12 and 13, the tip inserts 37' comprise the tips 1' which are bent relative to the horizontal alignment, that is, perpendicular to the axial direction X. An advantage of this configuration of the tips 1' is the possibility for injecting plastic components in non-divided mold inserts under angles which can deviate from the horizontal position, for example, 90°, and can reach up to 0° without any limitations.

The bent region of tips 1' may undercut the contour of the gating recess 32 of the die because the respective counter-contours of the mold can be circumvented as a result of the swiveling in during mounting.

As a result, articles such as disposable syringes can be injected at the handle part under 0° (see FIGS. 14 and 15) or articles such as pipettes on a shoulder under 45° (see FIG. 11).

Embodiments of hot runner nozzles with such tip inserts are shown in FIGS. 13 and 14. In accordance with FIG. 13, the tip inserts 37' face radially to the outside, whereas in the rectangular nozzle body shown in FIG. 17 they are aligned in two adjacently disposed rows with tips 1' which face away from one another.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A hot runner nozzle for lateral injection of plastic components, the nozzle comprising:
a multi-part nozzle body including at least one tip element which protrudes outwardly over a circumferential area of the nozzle body; and
the multi-part nozzle body further including a nozzle body clamping disk section and a nozzle body base section having an axial side that has at least one recess arranged on the axial side to accommodate the at least one tip element which is pressed with the nozzle body clamping disk section against the axial side of the nozzle body base section such that the clamping disk section provides for a direct sealing of the at least one tip element to the nozzle body base section and provides for a fixing of the at least one tip element relative to the nozzle body base section.

2. The hot runner nozzle according to claim 1, wherein the nozzle body base section has a circular, elliptical, oval or polygonal cross section.

3. The hot runner nozzle according to claim 1, wherein the at least one recess is aligned radially circumferentially distributed on the axial side.

4. The hot runner nozzle according to claim 1, wherein the at least one tip element includes a tip insert having a sealing sleeve.

5. The hot runner nozzle according to claim 4, wherein the nozzle body base section comprises a melt entrance opening into a melt channel which includes a first section which extends axially through the nozzle body base section up to a branching, from which at least one partial channel branches off in an angular manner, which at least one partial channel opens into the at least one recess.

6. The hot runner nozzle according to claim 5, wherein the at least one partial channel is in alignment with entrance openings of the melt channel in the tip insert which is inserted in the at least one recess.

7. The hot runner nozzle according to claim 4, wherein the nozzle body clamping disk section is arranged such that it only presses on the at least one tip element.

8. The hot runner nozzle according to claim 4, wherein the at least one tip element is arranged such that after the insertion in the at least one recess the at least one tip element is enclosed partly by the at least one recess.

9. The hot runner nozzle according to claim 4, wherein the at least one tip element includes an oblique surface and rests against an oblique surface in the at least one recess in a region of a base body of the tip insert.

10. The hot runner nozzle according to claim 5, wherein the at least one tip element rests on its side facing a tip of the at least one tip element via a shoulder on a surface of the nozzle body base section in the at least one recess, which surface faces away from the tip.

11. The hot runner nozzle according to claim 10, wherein the surface further rests on another surface of the nozzle body clamping disk section.

12. The hot runner nozzle according to claim 10, wherein the at least one tip element rests in the at least one recess via a shoulder on its side facing the tip and via an oblique surface on its side facing away from the tip.

13. The hot runner nozzle according to claim 12, wherein the melt channel opens into the oblique surface.

14. The hot runner nozzle according to claim 10, wherein the melt channel includes an outlet opening into an annular gating recess which encloses the tip.

15. The hot runner nozzle according to claim 4, wherein the nozzle body clamping disk section includes a circumferential axial edge which encloses a central recess, with the circumferential axial edge comprising an edge recess on the axial side facing, in the mounted state, towards the at least one recess of the nozzle body base section, with the tip insert engaging in the edge recess.

16. The hot runner nozzle according to claim 1, wherein the nozzle body clamping disk section is held by at least one fastening screw on the nozzle body base section which aligns with a central longitudinal axis of the nozzle body base section.

17. The hot runner nozzle according to claim 1, wherein the nozzle body clamping disk section is held by a plurality of fastening screws on the nozzle body base section.

18. The hot runner nozzle according to claim 17, wherein the nozzle body clamping disk section is further held on the nozzle body base section by additional fastening screws which are arranged about a central fastening screw in a circle configuration.

19. The hot runner nozzle according to claim 18, wherein the plurality of fastening screws penetrate bores of the nozzle body clamping disk section and are screwed into axial bores of the nozzle body base section.

20. The hot runner nozzle according to claim 1, wherein the nozzle body base section is enclosed by at least one heating element which is enclosed by an outer sleeve which carries a secondary sealing collar.

21. The hot runner nozzle according to claim 20, wherein a support and centering ring fixes the heating element and the outer sleeve and is fastened to the nozzle body base section in a mounted state.

22. The hot runner nozzle according to claim 1, wherein the nozzle body clamping disk section comprises a sealing collar.

23. The hot runner nozzle according to claim 10, wherein the tip of the at least one tip element is configured such that, in the mounted state, the tip reaches a surface of an article to be injected.

24. The hot runner nozzle according to claim 4, wherein the sealing sleeve is connected with the at least one tip element in an interlocking or friction-locked manner.

25. The hot runner nozzle according to claim 4, wherein the sealing sleeve is placed on the at least one tip element.

26. The hot runner nozzle according to claim 4, wherein the sealing sleeve is placed on a shoulder of the at least one tip element.

27. The hot runner nozzle according to claim 4, wherein the sealing sleeve is formed integrally with the at least one tip element.

28. The hot runner nozzle according to claim 4, wherein the sealing sleeve rests on a wall of a surrounding die, so that after reaching an operating temperature there is a surface pressing between the sealing sleeve and the wall of the die by thermal expansion of the nozzle.

29. The hot runner nozzle according to claim 1, wherein the at least one tip element includes an actuating contour for one or both of a mounting and dismounting of a tool.

30. The hot runner nozzle according to claim 29, wherein the actuating contour is a threaded bore configured to accommodate a threaded pin as the mounting or the dismounting tool.

31. The hot runner nozzle according to claim 30, wherein the actuating contour is configured as an application contour for a lever acting as the mounting or the dismounting tool.

32. The hot runner nozzle according to claim 29, wherein the at least one tip element includes a bent-off tip.

33. The hot runner nozzle according to claim 32, wherein the bent-off tip is aligned at an angle of between 0° and 90° in relation to an axial direction of the nozzle body clamping disk section.

34. The hot runner nozzle according to Clam 32, wherein the bent-off tip undercuts a contour of a gating recess of an associated die.

35. The hot runner nozzle according to claim 32, wherein the at least one tip element includes a base body, adjacent to which there is the bent-off tip having a cylindrical area and a radially outwardly adjacent conical area which faces outwardly in a mounted state of the nozzle body and protrudes beyond a circumferential edge of the nozzle body.

36. The hot runner nozzle according to claim 10, wherein the at least one tip element includes a base body, adjacent to which there is the at least one tip having a cylindrical area and an outwardly adjacent conical area under an angle γ which is larger than 0° relative to the cylindrical area, which at least one tip protrudes in the mounted state on the nozzle body in an oblique manner in relation to an axial direction of the nozzle body base section beyond the circumferential edge of the nozzle body.

37. The hot runner nozzle according to claim 4, wherein the at least one tip element is arranged such that after the insertion in the at least one recess the at least one tip element is half enclosed by the at least one recess.

38. The hot runner nozzle according to claim 32, wherein the bent-off tip is aligned at an angle between 0° and 45° in relation to an axial direction of the nozzle body clamping disk section.

* * * * *